United States Patent
Berger et al.

(10) Patent No.: US 11,880,632 B2
(45) Date of Patent: Jan. 23, 2024

(54) METHOD OF MANAGING AT LEAST ONE AUDIO PLAYBACK EQUIPMENT GROUP

(71) Applicant: SAGEMCOM BROADBAND SAS, Rueil Malmaison (FR)

(72) Inventors: Jérôme Berger, Rueil Malmaison (FR); Gabriel Bouvigne, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 218 days.

(21) Appl. No.: 17/148,035

(22) Filed: Jan. 13, 2021

(65) Prior Publication Data

US 2021/0311691 A1   Oct. 7, 2021

(30) Foreign Application Priority Data

Apr. 1, 2020   (FR) ....................................... 2003261

(51) Int. Cl.
  *G06F 3/16*   (2006.01)
(52) U.S. Cl.
  CPC .................................. *G06F 3/165* (2013.01)
(58) Field of Classification Search
  CPC ........................................................ G06F 3/165
  USPC ........................................................... 700/94
  See application file for complete search history.

(56) References Cited

U.S. PATENT DOCUMENTS

| | | | | |
|---|---|---|---|---|
| 10,979,810 | B2 * | 4/2021 | Mata Magana | H04R 5/02 |
| 2007/0067055 | A1 * | 3/2007 | Terada | H04H 60/04 |
| | | | | 381/119 |
| 2008/0056514 | A1 * | 3/2008 | Ito | H04B 1/202 |
| | | | | 381/119 |
| 2009/0304194 | A1 * | 12/2009 | Eggleston | H04R 29/001 |
| | | | | 381/59 |
| 2018/0233137 | A1 * | 8/2018 | Torok | G06F 3/167 |
| 2018/0352506 | A1 | 12/2018 | Young | |

FOREIGN PATENT DOCUMENTS

EP         3286759 B1    6/2020
WO   WO2016/033400 A1   3/2016

* cited by examiner

*Primary Examiner* — Joseph Saunders, Jr.
(74) *Attorney, Agent, or Firm* — Muncy, Geissler, Olds & Lowe, P.C.

(57) ABSTRACT

A method of managing at least one audio playback equipment group including at least one piece of audio playback equipment is provided with a light-emitting identification interface. The method includes the steps of: using the light-emitting identification interface of the piece of audio playback equipment to display a light pattern characteristic at least of the group to which said piece of equipment belongs and/or characteristic of the role of the piece of equipment within said group in the event of at least one of the pieces of audio playback equipment being selected, and performing an action relating to the associated piece of audio playback equipment.

18 Claims, 3 Drawing Sheets

```
{
    "jsonrpc": "2.0",
    "method": "led_ring.set_pattern",
    "params": {
        "pattern": [ "on", "off", "off", "on", "off", "off",
                     "blink", "off", "off", "off", "off", "off" ]
    },
    "id": 43
}
```

METHOD OF MANAGING AT LEAST ONE AUDIO PLAYBACK EQUIPMENT GROUP

The invention relates to the field of audio playback via one or more pieces of audio playback equipment.

BACKGROUND OF THE INVENTION

In modern multimedia installations for the home, it is nowadays very common to connect decoder equipment, of the set-top box (STB) type, to one or more pieces of audio playback equipment.

Specifically, the pieces of audio playback equipment can thus be used to play the same audio stream simultaneously, thereby improving the listening experience of the user. For example, audio playback equipment may be arranged in two different rooms in a home, with the audio stream being played simultaneously by two different pieces of equipment then enabling the user to move between those two rooms without interruption to listening.

Nevertheless, such an installation requires the pieces of audio playback equipment to be grouped together in order to manage such simultaneous playing of the audio stream by the different pieces of audio playback equipment. It is therefore appropriate for the user to be able to identify the different pieces of audio playback equipment easily in order to be able to group them together in desired manner.

For this purpose, proposals have been made to rely on the serial number of each piece of audio playback equipment. Specifically, the serial number is generally printed on a label under the audio playback equipment or on its rear face, where it can be read by the user.

Nevertheless, the label is difficult to access while pieces of audio playback equipment are in use, thereby making identification more complicated for the user.

Proposals have also been made to cause each piece of audio playback equipment to play a different sound in order to make it easier to identify. Unfortunately, once more, such a solution cannot be used while the pieces of audio playback equipment are in use, at least not without temporarily interrupting play back of the audio stream.

OBJECT OF THE INVENTION

An object of the invention is to propose a method of managing at least one audio playback equipment group that makes it easy to identify the piece(s) of audio playback equipment both during an initial stage of creating the group and also subsequently during a stage of using said group.

SUMMARY OF THE INVENTION

In order to achieve this object, the invention provides a method of managing at least one audio playback equipment group comprising at least one piece of audio playback equipment provided with a light-emitting identification interface, the method comprising the steps of:
  using the light-emitting identification interface of the piece of audio playback equipment to display a light pattern characteristic at least of the group to which said piece of equipment belongs and/or characteristic of the role of the piece of equipment within said group;
  in the event of at least one of the pieces of audio playback equipment being selected, performing an action relating to the associated piece of audio playback equipment.

As a result, use is made of the light-emitting identification interface(s) of the piece(s) of audio playback equipment for easy identification, equally well when not in a stage of listening (e.g. during an initialization stage for creating a group) or when in a stage of listening (e.g. in order to incorporate a new piece of audio playback equipment in an existing group). Specifically, making use of the light-emitting identification interface does not degrade the sound playback of an audio stream being played by the audio playback equipment.

For the present invention, an audio playback equipment group may potentially contain only one piece of audio playback equipment, depending on a user's configuration requests.

Optionally, a piece of audio playback equipment is selected by acting directly on said piece of audio playback equipment.

Optionally, a piece of audio playback equipment is selected by acting on a graphics control interface.

Optionally, the graphics control interface is distinct from the audio playback equipment.

Optionally, the method includes the step of displaying a symbol that is representative of the light pattern and that is therefore associated with the corresponding piece of audio playback equipment.

Optionally, a piece of audio playback equipment is selected by selecting the symbol by means of the graphics interface.

Optionally, the symbol is identical to the light pattern with which it is associated.

Optionally, the symbol is similar to the light pattern with which it is associated.

Optionally, the action consists in acting on the light pattern of the piece of audio playback equipment in order to modify it.

Optionally, the action consists in causing the selected piece of audio playback equipment to play an audio stream.

Optionally, the method includes an additional step of storing the user's selection.

Optionally, the method includes an additional step of the piece of audio playback equipment displaying a temporary light pattern while it is being selected by the user and prior to the user validating the selection.

Optionally, the light pattern is defined by a shape and/or by a color and/or by blinking and/or by animation.

The invention provides an appliance including a graphics control interface for performing at least the step of displaying the pattern in the method as specified above.

Optionally, the appliance is a mobile telephone or a tablet or a computer.

The invention also provides a piece of audio playback equipment including a light-emitting identification interface for performing at least the step of displaying the light pattern of the method as specified above.

Optionally, the light-emitting identification interface comprises at least two light-emitting diodes (LEDs).

Optionally, the light-emitting identification interface is arranged on a top face of the piece of audio playback equipment.

The invention also provides a computer program including instructions enabling the above-specified method to be executed.

The invention also provides a computer readable storage medium on which the above-specified computer program is stored.

Other characteristics and advantages of the invention appear on reading the following description of particular, nonlimiting implementations of the invention.

BRIEF DESCRIPTION OF THE DRAWINGS

The invention can be better understood in the light of the following description given with reference to the accompanying figures, in which.

DETAILED DESCRIPTION OF THE INVENTION

Figure 1:
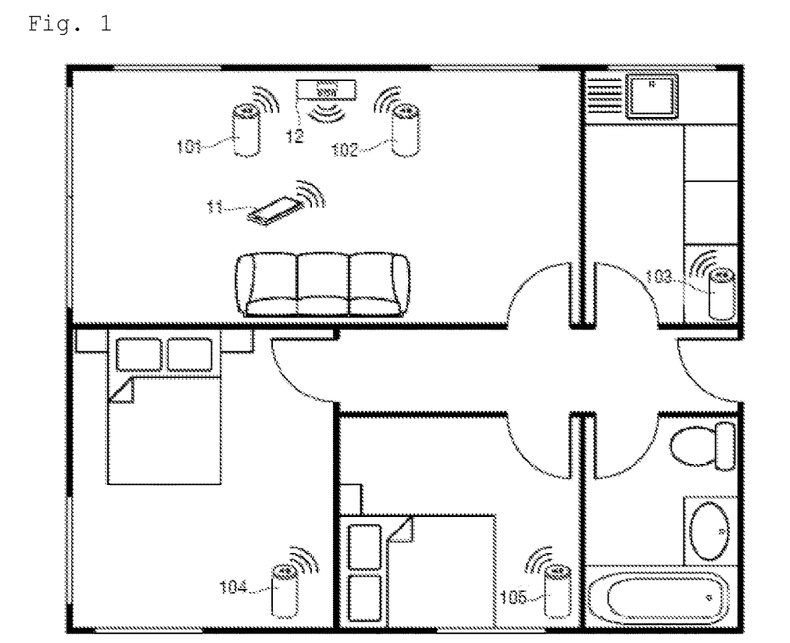
FIG. 1 is a diagram showing a home in which there is arranged an installation enabling the invention to be implemented.

With reference to FIG. 1, there follows a description of an example of an installation capable of implementing the invention.

The solution is installed in the home of a user, and in this example it comprises an audio source such as a piece of decoder equipment 12 together with at least two pieces of audio playback equipment. Furthermore, the installation also includes a movable appliance 11 that can be moved about the home, the appliance 11 being provided with a graphics interface for controlling at least the pieces of audio playback equipment, and preferably the entire installation.

In the present example, the installation has five pieces of audio playback equipment 101, 102, 103, 104, and 105. Furthermore, in this example, the decoder equipment 12 does not include any audio playback equipment: each piece of audio playback equipment forms a distinct entity that is in communication with the decoder equipment 12. In the example described, only a portion of the installation is to be found in any one room. Typically, the decoder equipment 12 is arranged in a living room having on one side a first piece of audio playback equipment 101 for a left channel and on its other side a second piece of audio playback equipment 102 for a right channel (where "left" and "right" are considered from the point of view of the user and not of the decoder equipment 12). As for the third, fourth, and fifth pieces of equipment 103, 104, and 105, they are arranged respectively in a second room, in a third room, and in a fourth room.

In this example, the decoder equipment 12 is a decoder box, and the pieces of audio playback equipment are loudspeakers external to said decoder box and connected thereto. In this example, the appliance 11 is a smartphone, the graphics control interface being the touchscreen of said smartphone.

Figure 2:
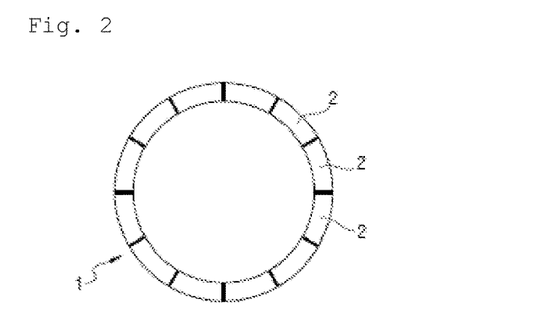
FIG. 2 is a plan view of a piece of audio playback equipment in the installation shown in FIG. 1.

Also, as shown in FIG. 2, each piece of audio playback equipment is provided with a light-emitting identification interface 1, which by way of example is arranged on the top face of the corresponding piece of audio playback equipment (i.e. the face remote from the face of the audio playback equipment resting on the floor or on a support such as a piece of furniture).

Said light-emitting identification interface 1 has one or more light-emitting elements 2 of the LED type (only some of which are referenced). Thus, the light-emitting identification interface 1 has a plurality of LEDs. By way of example, the light-emitting identification interface 1 has 8 to 18 LEDs, e.g. 10 to 15 LEDs. In this example, the light-emitting identification interface 1 has 12 LEDs.

In the present example, the LEDs together form a ring-shaped figure, which figure is thus arranged on the top face of the corresponding piece of audio playback equipment.

Independently of the other LEDs of the same light-emitting identification interface 1, each LED may be configured to display only one color or may be configured to be capable of displaying a plurality of colors (as is possible for example with a red, green, blue (RGB) LED). In service, the decoder equipment 12 acquires one or more incoming audio streams that may come from one or more broadcast networks. The broadcast networks may be of various sources: satellite, cable, Internet protocol (IP), digital terrestrial television (DTT) network, Internet connection, etc. As a variant or in addition, the decoder equipment 12 includes a memory zone having one or more audio streams stored locally therein.

Each piece of audio playback equipment is connected to an audio output of the decoder equipment 12. The term "audio output" is used to mean an output on which the decoder equipment 12 applies at least one audio stream in order to enable audio to be played back via (at least) one piece of audio playback equipment, e.g. on receiving a corresponding order from the appliance 11. Consequently, each piece of audio playback equipment includes its own processor means for processing the audio stream delivered by the decoder equipment 12.

In this example, the communication channel conveying the audio signal between the decoder equipment 12 and each piece of audio playback equipment is a wireless channel. In other variants, the communication channel could be of wired type (e.g. Ethernet). Any type of technology may be used for providing this channel: optical, radio, etc. The channel may thus use various different "computer" protocols (e.g. Bluetooth, UPnP, Airplay, Chromecast, Wi-Fi, etc.). Thus, and in accordance with a nonlimiting option, each piece of audio playback equipment is connected to the decoder equipment 12 via a local network. By way of example, the local network is a wireless network of Wi-Fi type (i.e. the communication channel between the decoder equipment and the audio playback equipment is a Wi-Fi link). In another variant, the local network includes a Wi-Fi router, the decoder equipment 12 is connected to said Wi-Fi router via a wired connection of Ethernet type, and/or is connected to the Wi-Fi router via a wireless connection of Wi-Fi type, and the Wi-Fi router is connected to each piece of audio playback equipment via a wireless connection of Wi-Fi type.

In the same manner, the appliance 11 may communicate with the decoder equipment 12 and with the pieces of audio playback equipment, preferably by wireless communication. Any type of technology may be used for providing such communication: optical, radio, etc. This communication may thus use various different "computer" protocols (e.g. Bluetooth, UPnP, Airplay, Chromecast, Wi-Fi, etc.). Thus, and in accordance with a nonlimiting option, the appliance 11 is likewise connected via the local network to the decoder equipment 12 and to the various pieces of audio playback equipment.

There follows a description of how the various pieces of audio playback equipment in the installation are managed.

Specifically, the user may desire to group together certain pieces of audio playback equipment so that they play the same audio stream.

For example, the user may desire to group together the first and second pieces of audio equipment 101 and 102 in such a manner that the first piece of equipment 101 plays the left channel and the second piece of equipment 102 plays the right channel of the same first audio stream in stereo as delivered by the decoder equipment 12, the two pieces of equipment 101 and 102 then playing in synchronized manner. By way of example, the user may desire to group two other pieces of equipment 103 and 104 with the stereo pair 101 and 102 in such a manner that each of the pieces of equipment 103 and 104 plays the entire first audio stream in synchronous manner with the stereo pair 101 and 102.

Thus, the user can move between the first room, the second room, and the third room without interrupting listening. By way of example, the user may also choose to leave the fifth piece of equipment 105 independent of the other four pieces of equipment 101, 102, 103, and 104 in order to play a second audio stream in the fifth room, which second audio stream is different from the first audio stream.

In a variant, the user may choose:
- to group together the first and second pieces of audio equipment 101 and 102 in such a manner that the first piece of equipment 101 plays the left channel and the second piece of equipment 102 plays the right channel of the same first audio stream in stereo as delivered by the decoder equipment 12, the two pieces of equipment 101 and 102 then playing in synchronized manner;
- to group together the third, fourth, and fifth pieces of equipment 103, 104, and 105 in such a manner that these three pieces of equipment 103, 104, and 105 play the same second audio stream as delivered by the decoder equipment 12, which second audio stream is different from the first audio stream, the three pieces of equipment 103, 104, and 105 then playing in mutually synchronized manner (but independently of the first and second pieces of equipment 101 and 102).

Under such circumstances, it is preferable to be able to assist the user in identifying the various pieces of audio playback equipment and the way they are grouped together in order to enable the user to manage them better.

Consequently, when a user requests identification of an audio playback equipment group, the appliance 11 orders each piece of audio playback equipment to use its light-emitting identification interface to display a light pattern that is characteristic at least of the group to which said piece of audio playback equipment belongs. In this example, the light pattern is created by the LEDs of the piece of equipment in question.

The user can thus easily visualize the audio playback equipment groups and how they are organized in the home.

Also, in the present example, the appliance 11 displays, on its graphics control interface, as many symbols as there are patterns. Each symbol is identical to the associated pattern or else is similar to the associated pattern.

Thus, the user can easily select one or more audio playback equipment groups by tapping on the graphics control interface on the displayed symbol that corresponds to the associated pattern and thus to the associated group.

Depending on the user's selection, one or more action orders may be generated by the appliance 11 for the attention of the decoder equipment 12 and/or of one or more pieces of audio playback equipment, which actions are associated with the selected audio playback equipment group(s).

Managing the pieces of audio playback equipment is thus found to be simple and quick for the user.

Figure 3:
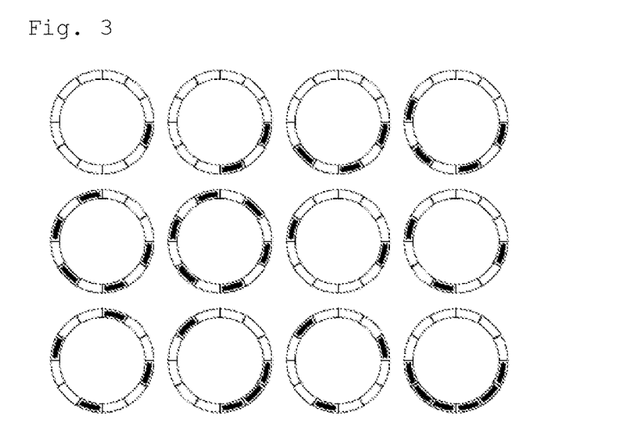
FIG. 3 shows, by way of nonlimiting indication, various different light patterns that can be displayed by the equipment shown in FIG. 2.

FIG. 3 shows examples of light patterns that may be displayed by the light-emitting identification interfaces 1. By way of example, the patterns may be formed by one segment of the ring, by two segments of the ring that may be opposite or adjacent or separated, by every other segment over a fraction or all of the circumference of the ring, . . . .

The patterns may be generated either by switching on some of the LEDs while the others are switched off, or else by having some of the LEDs in a first color and others of the LEDs in the second color.

The patterns may also be steady, blinking (e.g. by causing one or more LEDs to blink) or indeed animated (for example a pattern may be formed by having a single LED that is on at a time, with the LEDs being switched on one by one in turn to give the illusion that the pattern is turning around the circumference of the ring).

A pattern is thus defined by its shape and/or its color and/or its blinking and/or its animation.

The symbols reproduced on the graphics control interface can then reproduce exactly the patterns such as those shown by way of example in FIG. 3 (optionally with corresponding blinking and/or animation) or else they may be similar but not identical to said patterns (e.g. reproducing the shape and/or the color, but not any blinking and/or animation). In another example of a symbol that is similar but not identical, if the pieces of audio playback equipment in a given group are characterized by patterns of the same color (e.g. the patterns are blue in color), then the symbol may optionally be a simple blue spot without identically reproducing the pattern(s) generated by the light-emitting identification interfaces of the group in question.

Thus, various configurations can be envisaged:
- defining a respective group for each piece of audio playback equipment, each group thus comprising only one piece of audio playback equipment, and ordering a different pattern to be displayed for each group, thereby enabling each piece of audio playback equipment to be identified individually;
- ordering different patterns to be displayed for each audio playback equipment group, with any pieces of audio playback equipment belonging to the same group then displaying the same pattern, thereby enabling the various different groups to be identified;
- ordering different patterns to be displayed for each audio playback equipment group, with any pieces of audio playback equipment belonging to the same group then all displaying different variations of the same pattern associated with said group, thereby enabling not only the various different groups but also the individual pieces of audio playback equipment to be identified.

As mentioned above, it is the appliance 11 that delivers display orders to the various pieces of audio playback equipment. Such an order may be delivered using a control protocol such as a JavaScript object notation remote procedure call (JSON-RPC) protocol or indeed a common object request broker architecture (CORBA) protocol.

Figure 5:
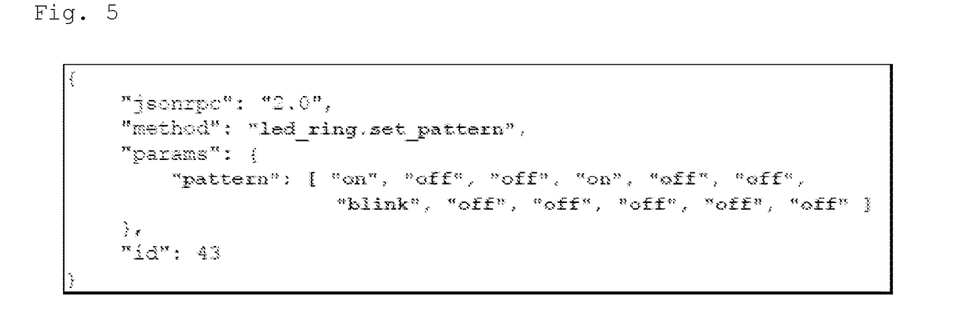
FIG. 5 shows an example of an order for implementing one of the steps shown diagrammatically in FIG. 4.

FIG. 5 thus gives an example of a display order in the JSON-RPC protocol as sent by the appliance 11 to a piece of audio playback equipment. In this example, the display order tells each LED of the audio playback equipment which state it is to have (one state selected from the following three states: on, off, and blinking) thereby enabling the audio playback equipment to reproduce a particular pattern so that said equipment can be identified, and in particular so that the group to which it belongs can be determined.

For example, each piece of audio playback equipment in a given group can display the pattern characteristic of said group with at least one of its LEDs blinking (the LED that blinks then varying from one piece of audio playback equipment to another within a given group) and/or each piece of audio playback equipment in a given group can display the pattern characteristic of said group with at least one of its LEDs having a color that is different from the colors of the other LEDs (the color of this isolated LED then varying from one piece of audio playback equipment to another and/or the position of this isolated LED relative to the remainder of the ring then varying from one piece of audio playback equipment to another) and/or each piece of audio playback equipment in a given group can display a different shape of pattern but with a color that is characteristic of said group (color varying from one group to another and pattern shapes varying from one piece of equipment to another) and/or each piece of audio playback equipment of a given group can display a different shape of pattern but with blinking and/or animation characteristic of said group (the blinking and/or animation varying from one group to another and the pattern shapes varying from one piece of equipment to another).

There follows a description of nonlimiting examples of action orders that can be generated by the appliance for sending to the decoder equipment and/or to one or more pieces of audio playback equipment, which actions relate to the audio playback equipment group(s) selected by the user.

Optionally, it is the user who selects which action(s) is/are to be performed, optionally from a general menu displayed on the graphics control interface. By way of example, the general menu presents a list of different possible actions (creating a new group of at least two pieces of audio playback equipment, modifying an existing group, giving a particular role to a piece of audio playback equipment in an existing group or modifying such a role, causing an equipment group to play an audio stream, etc.). Thus, if the user clicks on one of these actions, the appliance then performs various steps enabling the action to be performed.

Figure 4:
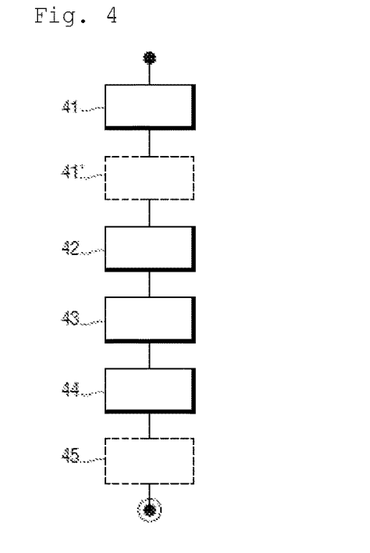
FIG. 4 is a diagram showing the various steps of a first implementation of the invention by the installation shown in FIG. 1.

With reference to FIG. 4, a first possible action is creating a new group of at least two pieces of audio playback equipment.

For this purpose, during a first step 41, the appliance 11 determines which pieces of audio playback equipment are present on the local network and constructs a corresponding list, which list may optionally already specify audio playback equipment groups that are already in existence.

For this purpose, the appliance 11 may implement various protocols. For example, the appliance 11 may make use of a protocol of the multicast domain name system (mDNS) type which waits for each piece of audio playback equipment to announce its availability by issuing regular "multicast" messages (i.e. messages that can be received by all of the peripherals connected to the local network, namely in this example the appliance 11, the pieces of audio playback equipment, and the decoder equipment 12): the appliance 11 can thus listen to these messages and can easily construct a list of the pieces of audio playback equipment that are present on the local network. Typically, the appliance 11 has processor means fitted with "Bonjour" or "Avahi" software enabling such an mDNS protocol to be implemented.

As a variant or in addition, the appliance 11 may implement other protocols in order to determine which pieces of audio playback equipment are available, e.g. such as a UPnP protocol in which pieces of equipment also indicate their presence by means of messages of the ssdp:alive type, possibly in response to an equipment search initiated by the appliance 11 itself, such as by using an M-SEARCH message.

During a second step 42, the appliance 11 allocates a group to each piece of audio playback equipment that is not already part of a group, with each new group thus comprising only one piece of audio playback equipment. Furthermore, the appliance 11 allocates a different light pattern to each group (whether new or already existing) and sends an order to each group to display the corresponding light pattern via its graphics identification interface 1.

During a third step 43, the appliance 11 causes its own graphics controller interface to display symbols corresponding to the various different light patterns of the pieces of audio playback equipment.

This enables the user to identify properly each piece of audio playback equipment that is isolated (the only piece in its group), thereby making it easier for the user to select the symbol(s) corresponding to the pieces of audio playback equipment that are to be grouped together.

During a fourth step 44, when the user validates the selection, the appliance 11 creates a new group with the pieces of audio playback equipment having the symbols that have been selected.

Optionally, during a fifth step 45, the appliance 11 sends an order to display the same pattern representative of said new group to all of the pieces of audio playback equipment in said newly-created group. This pattern may be the pattern that was allocated to one of the pieces of audio playback equipment in said new group during the second step 42 and that is copied by the other pieces of audio playback equipment in that new group, or else it may be any other pattern.

Thus, the user can easily create a group of pieces of audio playback equipment and subsequently can also easily visualize that group, since all of the pieces of audio playback equipment will be displaying the same pattern.

In a variant of this first action, an additional step 41' is interposed between the first step 41 and the second step 42. This additional step 41' consists in the appliance 11 removing from the list all of the pieces of audio playback equipment that are already present in an existing group. The other steps are adapted accordingly.

As a result, the user can create a new group more easily since the number of symbols displayed on the graphics control interface is thus smaller.

Figure 6:
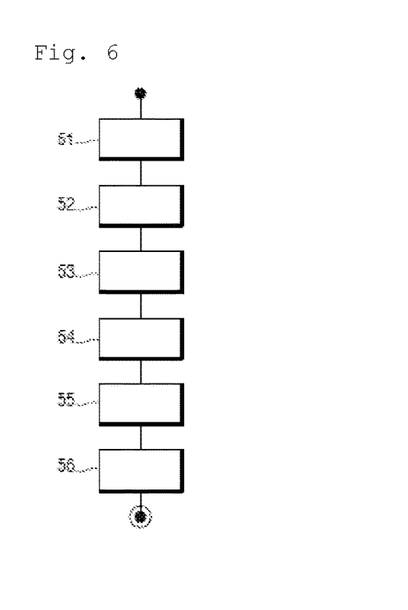
FIG. 6 is a diagram showing the various steps of a second implementation of the invention by the installation shown in FIG. 1.

With reference to FIG. 6, a second possible action is allocating different roles to at least two pieces of audio playback equipment belonging to the same group. By way of example, this makes it possible to define a stereo pair of pieces of audio playback equipment by allocating the left channel of a stereo audio stream to a first piece of audio playback equipment in a given group and by allocating the right channel of the same stream to a second piece of audio playback equipment in the same group. In more general manner, it is thus possible to allocate different channels of a type 3.1 or 5.1 multichannel system to different pieces of audio playback equipment in the same group.

For this purpose, during a first step 51, the appliance 11 determines which pieces of audio playback equipment belong to which groups. This first step 51 is identical in description to the first step 41, with an optional variant of hiding at least those groups that comprise only one isolated piece of audio playback equipment or of hiding all of the groups with the exception of a single group having at least two pieces of audio playback equipment (e.g. a group that is stored as being the "main" group, such as the audio playback equipment group that is present in the living room of the home).

In a second step 52, the appliance 11 determines whether any role has previously been allocated to each of the pieces of audio playback equipment in the retained group(s). If not, the appliance 11 may optionally allocate an arbitrary role to that piece of equipment.

In a third step 53, the appliance 11 sends the order to display a pattern representative of its associated group to each of the pieces of audio playback equipment in the retained group(s). If a role has already been allocated to one of the pieces of audio playback equipment (either beforehand or else arbitrarily in the second step 52), then the appliance 11 sends an order to display a variation of said pattern representative of the associated group, which variation is itself representative of the role of the piece of audio playback equipment in said group.

Figure 7:
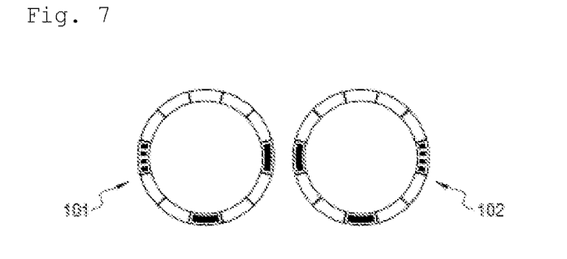
FIG. 7 shows the tops of two pieces of audio playback equipment belonging to the same group and participating in the second implementation symbolized in FIG. 6.

FIG. 7 shows an example of possible variations of a given pattern that can be used to identify a stereo pair of pieces of audio playback equipment. The two pieces of audio playback equipment in the stereo pair then switch on three LEDs in a T-shaped arrangement (i.e. two LEDs facing each other are switched on together with an LED that is arranged between said two LEDs, the other LEDs being switched off): this T-shaped arrangement is the pattern associated with their group. Also, the left piece of audio playback equipment 101 that is to be associated with the left channel causes its left LED to blink while leaving the other two LEDs steady, while the right piece of audio playback equipment 102 associated with the right channel causes its right LED to blink, while leaving the other two LEDs steady. This blinking is thus a variation of the pattern associated with the group, in which pattern all three LEDs are steady.

It can thus be understood that identifying the corresponding group can be combined with identifying a role within said group.

This is found to be particularly practical when the right and left pieces of audio playback equipment are a stereo pair in a group that also has a third piece of audio playback equipment acting as mono equipment. Specifically, it suffices to associate the T-shaped pattern with the third piece of audio playback equipment of the group (which thus does not have any particular role) and the blinking T-shaped patterns with the right and left pieces of audio playback equipment.

In another example, the right piece of audio playback equipment may switch on a blue right segment, the left piece of audio playback equipment may switch on a blue left segment, and the third piece of audio playback equipment may switch on an entire blue ring. The pattern associated with the group is thus the complete blue ring, and the variations of said pattern comprise switching on a fraction only of the ring.

In a fourth step 54, the appliance 11 uses its graphics control interface to display the symbols associated at least with the pieces of audio playback equipment belonging to the retained group(s).

In a fifth step 55, if the user selects one of these symbols, e.g. in order to request a change of the role of the associated piece of audio playback equipment, the appliance 11 sends to the corresponding piece of equipment an order to display the pattern or the variation corresponding to its new role. For example, when interchanging the roles of the right and left pieces of audio playback equipment, the appliance 11 sends respective orders to change the blinking LED to each of said pieces of equipment.

It is thus easy to allocate the same role to a plurality of different pieces of audio playback equipment: specifically, during the fifth step, it suffices for the user to select a plurality of symbols.

In a sixth step 56, when the user validates the new configuration, the appliance 11 records the roles of each of the pieces of audio playback equipment within the group in question.

In a first a variant, the appliance 11 may wait for the user to validate the configuration before ordering the change of pattern or the variation of pattern that corresponds to the new role allocated to a piece of audio playback equipment, as proposed above for the first action. In a variant, likewise in the same manner as for the first action, it is also possible to cause the patterns (or the pattern variations) to be modified as soon as the user makes the selection and even before the new configuration has been validated, as proposed above for the second action.

Figure 8:
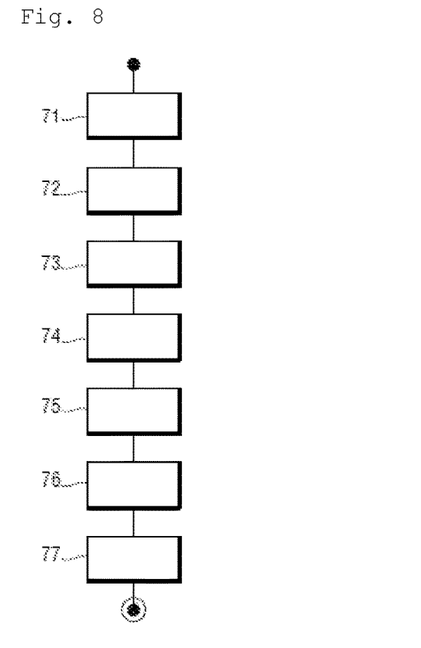
FIG. 8 is a diagram showing the various steps of a third implementation of the invention by the installation shown in FIG. 1.

FIG. 8 shows a second variant for implementing the second action.

The first four steps 71, 72, 73, and 74 are identical to the above description of the first four steps 51, 52, 53, and 54.

In contrast, in the fifth step 75, the user does not select one of the symbols directly by pressing on the touchscreen, i.e. by acting on the appliance 11, but selects the symbols indirectly by acting directly on the piece(s) of audio playback equipment. For example, the user may press one or more buttons of the intended piece of audio playback equipment. In a variant, the fourth step of displaying the symbols is not implemented.

After that, the piece of audio playback equipment in question sends a notification to the appliance 11.

It is thus easy to allocate the same role to a plurality of different pieces of audio playback equipment: specifically, during the fifth step 75, it suffices for the user to select the same pattern by pressing on a plurality of pieces of audio playback equipment.

During a sixth step 76, the appliance 11 then sends to the piece of equipment in question an order to display the pattern or variation corresponding to the new role of the piece of equipment. For example, when interchanging the roles of the right and left pieces of audio playback equipment, the appliance 11 sends respective orders to change the blinking LED to each of said pieces of equipment.

In a seventh step 77, when the user validates the new configuration, the appliance 11 records the roles of each of the pieces of audio playback equipment within the group in question.

Figure 9:
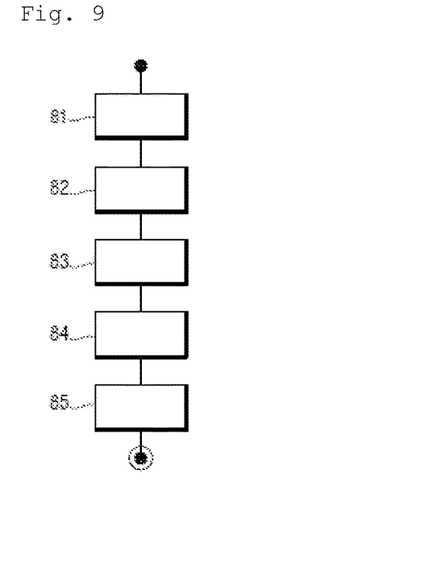
FIG. 9 is a diagram showing the various steps of a fourth implementation of the invention by the installation shown in FIG. 1.

With reference to FIG. 9, a third possible action is causing an audio stream to be played by a plurality of different pieces of audio playback equipment.

For this purpose, during a first step 81, the appliance 11 determines the available audio playback equipment groups. By way of example, this first step 81 is identical to the step 41 of the first action.

In a second step 82, the appliance 11 sends an order to each of the pieces of audio playback equipment to display a pattern (or pattern variation) representative of the group associated therewith.

In a third step 83, the appliance 11 causes its graphics control interface to display the symbols associated with the various groups.

This enables the user to identify properly the various groups thus making it easier to select the symbol(s) corresponding to the group(s) prior to playing the same audio stream.

During a fourth step 84, when the user validates the selection, the appliance 11 records the user's selection.

In a fifth step 85, the appliance 11 thus sends an activation order to the decoder equipment 12 containing the list of the activated group(s) so that the decoder equipment 12 sends the corresponding audio stream to the pieces of audio playback equipment of said activated group(s).

The description above shows that the installation makes it possible to control actions, and the examples described are not limiting.

Naturally, the invention is not limited to the implementations and embodiments described above, and variants may be provided without going beyond the ambit of the invention.

Thus, although above the decoder equipment is a decoder box, the decoder equipment could be any other equipment capable of performing audio decoding, such as an audio/video decoder, a digital video decoder, and for example it could be a game console, a computer, a smart TV, a digital tablet, a mobile telephone, a digital television decoder, a set-top box, etc. In general manner, although above the audio source comprises decoder equipment, the audio source could be any other equipment capable of supplying an audio stream to the pieces of audio playback equipment, such as a digital hi-fi system.

Although above the audio source and the appliance are distinct, the source and the appliance could form portions of the same unit. Thus, it could be the appliance that delivers an audio stream directly to at least one of the pieces of audio playback equipment. For example, the audio source could be an application running in a smartphone type appliance. Likewise, the audio source and the graphics control interface could be incorporated within a single STB decoder, with the graphics control interface being displayed on the television set and being controlled by the remote control of the STB decoder.

Although above the audio source is distinct from all of the pieces of audio playback equipment, the audio source and at least one of the pieces of audio playback equipment need not be distinct and could form portions of the same unit. This applies for example if the piece(s) of audio playback equipment directly process(es) audio streams coming from an external network of Internet type. It would thus be possible to have one or more pieces of audio playback equipment constituting smart pieces of audio playback equipment (such as "smartspeakers"), which would thus be capable of operating without the decoder equipment since they incorporate directly the ability to access the audio source, with such pieces of equipment playing an audio stream directly whether coming from an external network of Internet type or coming directly from a local network.

Although above the appliance is distinct from all of the pieces of audio playback equipment, the appliance and at least one of the pieces of audio playback equipment need not be distinct and could form portions of the same unit.

It would thus be possible in a single unit to have at least an appliance, a piece of audio playback equipment, and an audio source, which would then not be distinct.

The installation could equally well have a plurality of audio sources and/or a plurality of appliances, it being understood that the audio sources, the appliances, and the pieces of audio playback equipment could be coupled together in one or more units.

Although above the appliance is a mobile telephone, the appliance could be any other element provided with or connected to a graphics control interface. The appliance could thus be of various different kinds: a dedicated appliance, a mobile telephone or a tablet executing a dedicated application, a computer executing a dedicated application, or some other appliance (game console, digital television decoder, smart TV, . . . ) operating in dedicated manner or executing a dedicated application.

It is possible to interact with the graphics control interface either directly by touching said interface, or indirectly using a control element such as a remote control, a joystick, a stylus, a keyboard, a mouse, . . . . Thus, the symbol may be selected either directly or indirectly.

The invention need not make use of a display on a graphics control interface. For example, at an initial stage, each piece of audio playback equipment could display a different pattern by default. The user could then press on a button of the piece of audio playback equipment in order to select it and modify the pattern displayed. If the user modifies the pattern until reaching a pattern that is already displayed by some other piece of audio playback equipment, then the two pieces of equipment are grouped together. The pieces of audio playback equipment then displaying the same pattern constitute a group and play the same thing.

Furthermore, although above the piece of audio playback equipment is an external smartspeaker, it could be some other piece of equipment having a loudspeaker, e.g. a loudspeaker other than a smartspeaker, a sound bar, an audio system connected to a Wi-Fi/audio bridge, . . . , providing the piece of audio playback equipment includes a light-emitting identification interface. It is assumed that the pieces of audio playback equipment that have the same pattern (including variants) together constitute a group.

The light-emitting elements may be of shapes and arrangements other than those described, such as for example a matrix arrangement, a column arrangement, . . . . The light-emitting elements could be placed other than on the top of the audio playback equipment, e.g. on the front face of the equipment, or indeed behind the fabric covering a portion of the audio playback equipment. It would thus be possible to have an arrangement of light-emitting elements in the form of two columns on the two sides of a front face of the equipment, or indeed a matrix arrangement, potentially located behind the acoustic fabric.

Although above the light pattern is necessarily characteristic of the group to which a piece of audio playback equipment belongs (and optionally also of the role of a piece of equipment in said group), provision could be made for the pattern not to be characteristic of the group to which a piece of audio playback equipment belongs, but only of the role of a piece of equipment in said group (for example, it would be possible to display a pattern representative of the geographical position of the piece of audio playback equipment, such as right or left).

The numbers of pieces of audio playback equipment and/or of audio sources and/or of appliances and/or of graphics control interfaces could be greater than stated above.

The various above-mentioned communications could be via wired connections instead of via wireless connections.

Orders may be sent from the appliance to the pieces of audio playback equipment either directly or else indirectly, passing via the audio source. Orders may equally well be sent from the audio source to the pieces of audio playback equipment either directly or else indirectly, passing via the appliance.

The light patterns may remain permanently displayed on the pieces of audio playback equipment. Thus, for example, it would be intuitive for the user to remember that the pieces of audio playback equipment displaying a blue pattern form parts of the same group, whereas some other piece of audio playback equipment displaying an orange pattern is the only piece in its group, and indeed another piece of audio playback equipment displaying a green pattern is likewise the only piece in its group.

In a variant, the light pattern need no longer be displayed once the user has validated a configuration (either immediately or after a given time interval), or it may be displayed with reduced brightness once the user has validated a given configuration (either immediately or after a given time interval).

Independently of user validations, the patterns may likewise no longer be displayed or may be displayed at reduced or non-reduced brightness in the event of the piece of audio playback equipment in question being put on standby.

Preferably, independently of user validations and of being on standby or of the equipment, it would also be possible for the patterns no longer to be displayed or to be displayed with reduced or non-reduced brightness in the event of the piece of audio playback equipment in question playing an audio stream.

Likewise, although it is stated above that, at the beginning of each action, the appliance orders the pieces of audio playback equipment to display a pattern, this step need not be implemented by the appliance. For example, the display of the patterns at the beginning of each action may be permanent, or indeed it may be automatic. Automatic display may be triggered in numerous ways, for example while playback is taking place and/or:
- when the user presses on one of the pieces of audio playback equipment; and/or
- when the user presses on the graphics control interface; and/or
- when the playing of audio content is started by any means other than the appliance, e.g. such as a command sent by the local area or wide area network (LAN or WAN); and/or
- in general manner when an order is received by the audio playback equipment via any means other than the appliance, e.g. such as a command sent by a network.

Furthermore, at the beginning of setting up a given action, all of the available pieces of audio playback equipment could be identified once again, or else identification could start with a list of available pieces of equipment and/or groups, which list has already been made and stored in memory in the installation (e.g. in the source and/or in the appliance and/or in at least one of the pieces of audio playback equipment), which list may optionally be updated when new pieces of audio playback equipment are incorporated in the installation.

Furthermore, at the beginning of setting up each action, random patterns could be allocated to the available pieces of audio playback equipment or patterns could be allocated from a list of patterns/equipment allocations that has already been made and stored in memory in the installation (e.g. in the source and/or in the appliance and/or in at least one of the pieces of audio playback equipment), which list may optionally be updated when new pieces of audio playback equipment are incorporated in the installation. Under such circumstances, when the user requests a new action, pieces of audio playback equipment that already have a pattern allocated thereto display said patterns directly.

As mentioned above, the symbols displayed on the graphics control interface may be selected either by interacting directly with said interface (by pressing on it or via a control element) or else by interacting indirectly with said interface by interacting with the pieces of audio playback equipment (selecting a button typically carried on the piece(s) of equipment in question) and sending a message between said piece of equipment and said graphics control interface.

Optionally, for any of the intended actions, it is possible to insert an additional step of the user viewing a selection of one or more groups and/or of pieces of audio playback equipment. For example, each time the user adds or removes a symbol from the selection, the appliance then sends an order to the corresponding piece of audio playback equipment and/or group to modify temporarily the pattern displayed by the piece(s) of equipment in question. For example, when the user selects a symbol, the appliance sends an order to the corresponding piece of audio playback equipment and/or group to cause the pattern that is already being displayed by the piece(s) of audio playback equipment to blink, and/or when the user removes a symbol from the selection, the appliance sends an order to the corresponding piece of audio playback equipment and/or group to stop blinking the pattern; with this continuing until the user has validated the selection. Alternatively, each time the user selects or deselects a symbol, the appliance sends an order to the corresponding piece of audio playback equipment and/or group to cause the pattern that is being displayed to blink some limited number of times (e.g. two or three times).

By way of example, such an optional step may be interposed between the third step and the fourth step while performing the first action, during the fifth step while performing the second action, between the third step and the fourth step while performing the third action, . . . .

The display may have the same number of symbols as there are pieces of audio playback equipment, or fewer symbols or more symbols. For example, the number of symbols displayed may be the same as the number of groups, with a single symbol then being associated with a plurality of pieces of audio playback equipment in the same group.

Actions other than those described may be implemented, e.g. such as incorporating a new piece of audio playback equipment in an existing group, or indeed completely reconfiguring the installation.

For each action, it would be possible to modify the symbol associated with a given group or with a given piece of audio playback equipment when the user modifies the role of said equipment, the organization of a group, creates a new group, . . . in order to match the symbol with the new pattern (or its variation) associated with said group or when said piece of audio playback equipment. By way of example, the symbol may be modified in this way during the fourth step while performing the first action, during the fourth step while performing the second action, during the third step while performing the third action, . . . .

Naturally, the various embodiments, implementations, options, . . . described above may be combined with one another. For example, the first action could be implemented while allowing patterns to be displayed with variation, as in the second action.

The invention claimed is:

1. A method of managing at least one audio playback equipment group comprising at least one piece of audio playback equipment provided with a light-emitting identification interface, and arranged for playing a sound playback of an audio stream comprising at least one audio channel, the method comprising the steps of:
   using the light-emitting identification interface (1) of the piece of audio playback equipment to display a light pattern (2) characteristic at least of the group to which said piece of equipment belongs, the pattern;
      being defined by a shape, and/or by blinking, and/or by animation, and
      being characteristic of a role of the piece of equipment within said group;
   in the event of at least one of the pieces of audio playback equipment being selected, performing an action relating to the associated piece of audio playback equipment;
   using the light-emitting identification interfaces of pieces of audio playback equipment belonging to the same group to display different variations of a common pattern associated with said group, the different variations of said common pattern having for goal, for each pieces of audio playback equipment of said group, to communicate the role of said piece of audio playback equipment within said group, the role of said piece of audio playback equipment being to play a particular audio channel of the audio stream.

2. A method according to claim 1, wherein a piece of audio playback equipment is selected by acting directly on said piece of audio playback equipment.

3. A method according to claim 1, wherein a piece of audio playback equipment is selected by acting on a graphics control interface.

4. A method according to claim 3, wherein the graphics control interface is distinct from the audio playback equipment.

5. A method according to claim 1, including a step of displaying a symbol that is representative of the light pattern and that is therefore associated with the corresponding piece of audio playback equipment.

6. A method according to claim 5, wherein a piece of audio playback equipment is selected by selecting the symbol by means of the graphics interface.

7. A method according to claim 5 wherein the symbol is identical to the light pattern with which it is associated.

8. A method according to claim 5, wherein the symbol is similar to the light pattern with which it is associated.

9. A method according to claim 1, wherein the action consists in acting on the light pattern of the piece of audio playback equipment in order to modify it.

10. A method according to claim 1, wherein the action consists in causing the selected piece of audio playback equipment to play an audio stream.

11. A method according to claim 1, including an additional step of storing the user's selection.

12. A method according to claim 1, including an additional step of the piece of audio playback equipment displaying a temporary light pattern while it is being selected by the user and prior to the user validating the selection.

13. A piece of audio playback equipment including a light-emitting identification interface for performing at least the step of displaying the light pattern of the method according to claim 1.

14. A piece of equipment according to claim 13, wherein the light-emitting identification interface comprises at least two LEDs.

15. A piece of equipment according to claim 13, wherein the light-emitting identification interface is arranged on a top face of the piece of audio playback equipment.

16. An installation comprising:
   the piece of audio playback equipment according claim 13; and
   an appliance comprising a graphics control interface of at least said piece of audio playback equipment.

17. The installation according to claim 16, wherein the appliance is a mobile telephone or a tablet or a computer.

18. A non-transitory computer readable storage medium storing a computer program including instructions for executing the method according to claim 1.

* * * * *